US008571706B2

(12) United States Patent
Zhang et al.

(10) Patent No.: US 8,571,706 B2
(45) Date of Patent: Oct. 29, 2013

(54) METHOD AND SYSTEM FOR OPTIMIZING THE LAYOUT OF A ROBOT WORK CELL

(75) Inventors: Emily-DanDan Zhang, Shanghai (CN); Levy-LiWei Qi, Shanghai (CN); Steve Murphy, Hovås (SE)

(73) Assignee: ABB Research Ltd., Zürich (CH)

( * ) Notice: Subject to any disclaimer, the term of this patent is extended or adjusted under 35 U.S.C. 154(b) by 737 days.

(21) Appl. No.: 12/445,890

(22) PCT Filed: Feb. 20, 2008

(86) PCT No.: PCT/EP2008/052063
§ 371 (c)(1),
(2), (4) Date: Apr. 16, 2009

(87) PCT Pub. No.: WO2009/103335
PCT Pub. Date: Aug. 27, 2009

(65) Prior Publication Data
US 2010/0241248 A1   Sep. 23, 2010

(51) Int. Cl.
*G06F 19/00* (2011.01)
*G05B 19/18* (2006.01)

(52) U.S. Cl.
USPC .......................................... 700/245; 700/253

(58) Field of Classification Search
USPC .................................................. 700/245–264
See application file for complete search history.

(56) References Cited

U.S. PATENT DOCUMENTS

| | | | |
|---|---|---|---|
| 4,979,128 A | | 12/1990 | Seki et al. |
| 5,771,553 A | * | 6/1998 | Sim et al. .................... 29/407.09 |
| 6,292,715 B1 | * | 9/2001 | Rongo .......................... 700/249 |
| 6,526,373 B1 | * | 2/2003 | Barral ............................... 703/6 |
| 6,678,582 B2 | * | 1/2004 | Waled ............................ 700/245 |
| 6,721,615 B2 | * | 4/2004 | Fava et al. ....................... 700/99 |

(Continued)

FOREIGN PATENT DOCUMENTS

| | | |
|---|---|---|
| EP | 1107082 A2 | 6/2001 |
| WO | WO-2005/049284 A1 | 6/2005 |

OTHER PUBLICATIONS

U. Rossgoderer et al; A Concept for Automatical Layout Generation; IEEE; May 21, 1995; pp. 800-805.

(Continued)

*Primary Examiner* — Bhavesh V Amin
(74) *Attorney, Agent, or Firm* — Venable LLP; Eric J. Franklin (57) ABSTRACT

A method for optimizing placement of a plurality of workstations in a workcell including an industrial robot programmed to execute a sequence of tasks on the workstations. Each task contains robot targets to be visited by the robot when executing the task. A preferred region is defined within the reachable range of the robot. Tasks are placed inside or as close as possible to the preferred region using an evaluation criterion and an optimization algorithm. The tasks are assigned to each workstation a position inside or close to the preferred region. A best order of the workstations and a defined order in which the tasks are to be executed are determined. The positions of the workstations are adjusted utilizing an optimization algorithm configured to run the robot program iteratively in order to optimize the placement of the workstations with regard to the robot performance.

20 Claims, 7 Drawing Sheets

(56) References Cited

U.S. PATENT DOCUMENTS

| | | | |
|---|---|---|---|
| 6,812,665 B2 * | 11/2004 | Gan et al. | 318/568.11 |
| 6,847,922 B1 * | 1/2005 | Wampler, II | 703/1 |
| 7,512,459 B2 * | 3/2009 | Watanabe et al. | 700/245 |
| 2003/0200042 A1 * | 10/2003 | Gan et al. | 702/105 |
| 2005/0004709 A1 | 1/2005 | Watanabe et al. | |
| 2005/0055134 A1 * | 3/2005 | Okuda et al. | 700/245 |

OTHER PUBLICATIONS

M. L. Tay et al; "Optimizing Robot Workcell Layout"; International Journal of Advanced Manufacturing Technology; 1996; vol. 12, No. 5, pp. 377-385.

PCT/ISA/210—International Search Report—Dec. 16, 2008.

PCT/ISA/237—Written Opinion of the International Searching Authority—Dec. 16, 2008.

* cited by examiner

METHOD AND SYSTEM FOR OPTIMIZING THE LAYOUT OF A ROBOT WORK CELL

FIELD OF THE INVENTION

The present invention relates to a method and a system for optimizing the placement of a plurality of workstations in a workcell including an industrial robot programmed to execute a sequence of tasks on the workstations.

The invention relates to the technology of robot manipulators and automated production applications. The invention refers to a method and system for optimizing the layout of a work cell involving one or more tasks and an industrial robot executing these tasks.

PRIOR ART

Robots are usually placed in work cells in order to facilitate the automation of a complex series of actions. The work cell may comprise a number of different workstations and the robot can be programmed to perform different tasks at the different workstations. A workstation is a physical location on which the robot may carry out work. Examples of workstations are injection molding machines, die casting machines, scrap stations for throwing away rejected objects, devices for vision control of the object, stations for subsequent treatment of the object and output stations such as conveyors. The robot is programmed to visit the workstations, and thereby to carry out the tasks on the workstations, in a defined order. Examples of tasks are: pick a moulded object from the mould, throw the object in the waste basket, hold the object during a vision control, move the object in a predefined way in relation to a treatment tool, put the object in an assembly with other objects, place the object on the conveyer. The total time it takes for the robot to visit the workstations and to carry out the tasks during one program cycle is called the cycle time.

In automated manufacturing processes, the productivity of a robot can be improved considerably by minimizing the cycle time for completing a sequence of tasks. The cycle time of a robot for given tasks depends on many factors, such as how different tasks are positioned relative to the robot. In another words the layout of the robotic work cell is very important.

In recent years, some related research work has been done to address the robotic work cell layout issue.

U.S. Pat. No. 6,526,373 discloses a system for optimizing the assembly work cell layout in the context of industrial robotic CAD software products. The idea is to optimize the position of the robot. After obtaining the free acceptable domain according to the obstacle positions, the position of a robot is optimized using a Simulated Annealing (SA) method.

EP1 107 082 discloses a system that optimizes the positions of several machines relative to a robot with the same SA approach. The disclosed systems work with a real-time objective function based on a CAD software platform when searching a large layout space. However, workstations are placed in a work cell one by one sequentially, not handled together simultaneously. Hence, global optimization cannot be guaranteed. In fact, a good position for one workstation cannot be guaranteed still good if another workstation is put into consideration.

U.S. Pat. No. 4,979,128 discloses a simple method for deciding the robot workcell layout. But only a workable layout can be given, no layout optimization is involved.

US2005/0004709 discloses a method that aims to find an optimal robot placement relative to a workstation in terms of cycle time, and robot performance from kinematics and kinetics point of view. The method needs to use several provisional robot positions to define the index for robot performance, and hence to conduct optimization. This method can only handle one single workstation rather than several workstations, and hence is not applicable for the cases that robot has to handle several different workstations within one cycle which is very common for robotic automation processes.

Thus, there is a need to find optimal cell layout in terms of best positions of several workstations relative to a robot, in which all the workstations are treated equally.

The Simulated Annealing (SA) method runs the robot program iteratively during the optimization. Although it is theoretically possible to use the Simulated Annealing (SA) method to simultaneously optimize the layout in a workcell including more than one workstation, it is not practically possible since it is not likely that the method will find the optimal placement of the workstations within a reasonable time, if all possible placements are to be considered.

OBJECTS AND SUMMARY OF THE INVENTION

An overall aim of the present invention is to improve robot performance and increase productivity of a robotic work cell.

An object of the present invention is to provide a method and a system for automatic optimization of the placement of a plurality of workstations in a robot workcell in order to improve robot performance and increase productivity of a robotic work cell.

Such a method comprises three steps:
a) Defining a preferred region within the reachable range of the robot. Placing the tasks inside or as close as possible to the preferred region using an evaluation criterion and an optimization algorithm, and based thereon assigning each workstation a position inside or close to the preferred region.
b) Determining by means of an optimization algorithm a best order of the workstations to be placed relative to the robot with regard to the robot performance and a defined order in which the tasks has to be executed, and based thereon adjusting the positions of the workstations.
c) Adjusting the positions of the workstations by means of an optimization algorithm configured to run the robot program iteratively in order to optimize the placement of the workstations with regard to the robot performance.

The work cell includes an industrial robot and a plurality of workstations. For each workstation a task to be carried out by the robot is defined. Each task contains a series of robot targets linked as one or several paths to be visited by the robot when executing the task at the workstation. The positions of the robot targets are defined in a known and fixed relation to the workstation. Knowing the position of the task, i.e. the positions of the robot targets, means that the position of the workstation is known and vice versa.

The invention provides a method to optimize the layout of a robotic work cell, for example in terms of minimum cycle time, minimum stress, minimum energy consumption, minimum acceleration (max or limited) or other criteria, and hence to improve the productivity of a robot in automated manufacturing processes. The method can realize an optimal work cell layout with three major steps: firstly, the best position for each workstation is determined with use of a preferred region; secondly, based on the results from the first step, the optimal sequence of the workstations is determined with use of an optimization algorithm; finally, since the work cell layout derived from the first two steps is near optimal, the positions of the workstation can be adjusted simultaneously in a greatly reduced searching space by means an optimization algorithm, such as the Simulated Annealing method. The first two steps achieve almost optimum positions of the workstations. Thus, after the first two steps, a good layout of the work cell approaching optimum can be reached, which can greatly reduce the searching space, and thus the searching time, for all workstations in the final optimizing stage. After these three optimization steps, an optimal layout has been achieved. The invention can be used as a reference for cell layout and/or improve robot performance for a new robotic cell setup or existing cell adjustment.

In the first step each robot task is handled separately. A preferred region that can ensure best robot performance in terms of kinematics and kinetics is employed to determine the best position of each individual robot task. Advantageously, the preferred region is based on kinematic reachability using a given tolerance for potential changes. For example, the preferred region is based on a zone of maximum robot performance, performance being defined as one or several measurable robot parameters, such as speed, acceleration, reorientation, stress, energy etc, given a certain tolerance. The preferred region can be based on user and programmer experience. It is advantageous to optimize the placement of tasks within the preferred region using an evaluation function, based upon kinematic distance, time distance, etc. The evaluation criterion used by the optimization-algorithm can, for example, be to minimize the sum of the distances between the target points in the task and the center of the preferred area.

In the second step, all robot tasks are put into consideration together to seek a best order of the workstations to be placed according to the robot operational sequence. The order of workstations can be defined as the circumferential positions of the workstations relative to the robot. The circumferential position of the workstation is, for example, defined as the angle of the first axis of the robot when robot is rotated around the z-axis of the robot base frame. Preferably, an optimization algorithm is selected that uses the real execution time for the tasks in order to optimize the placement of the workstations. The optimization in the second step is done with regard to the robot performance, such as cycle time, stress, or energy. An optimization method aiming to improve task sorting, such as but not limited to the fast Genetic Algorithm (GA), is used to find the best order of the tasks to be placed.

In the third step, an optimization method that can ensure a better and better solution, such as but not limited to Simulated Annealing (SA), is used to finally fine-tune the placement of all workstations. The optimization in the third step is done with regard to robot performance, such as cycle time, stress, or energy. In the last two steps, all robot tasks are treated equally and handled simultaneously for a global optimization.

According to an embodiment of the invention, each of the tasks has an associated geometrical model of the workstation, and in each of the steps a-c, the placement of the workstations are made with regard to the satisfaction of the following conditions: the placement of the workstation must ensure that the robot reaches all targets of the path, and the associated geometrical model and the robot are free of collisions. Also, the positioning of a workstation must be done with regard to geometrical models of the other workstations in the workcell such that there will be no collisions between the workstations.

According to an embodiment of the invention, the first step further includes determining by means of an angle optimization algorithm a favorable orientation for each of the workstations with regard to the robot performance, such as cycle time, stress, or energy. The first part of the optimization according the first step optimizes the position (x, y, z) of the workcell and the second part optimizes the orientation ($\alpha$) of the workstation.

According to an embodiment of the invention, in the second step the best order of the workstations is determined by determining favorable circumferential positions of the workstations relative to the robot with regard to the robot performance, such as cycle time, stress, or energy, and adjusting the positions of the workstations such that the workstations are kept in their radial positions obtained during the first step. This solution for task sorting is based on the following assumption: If a task is rotated only around the Z-axis of the robot base frame, it will not influence the cycle time for the robot executing the task. That means, the best position of a task will be remained if it is only rotated around the Z-axis of the robot base frame. The solution for task sorting can be concluded: all tasks are put into the work cell together. Each task keeps its radial position and orientation obtained in the first step, but may be rotated with different angles around the Z-axis of the robot base frame, i.e. the circumferential positions of the workstations relative to the robot are adjusted. An advantage with this embodiment is that the searching time for finding optimal positions of the workstations is significantly reduced.

According to an embodiment of the invention, the optimization in step two includes seeking circumferential positions of the tasks and distances between the tasks, which minimize the distance traveled by the robot when the robot executes all tasks according to the defined order. Thus, the positions of the workstations and the distances between them are adjusted for a minimum travel distance, when the robot executes all tasks according to the defined visit order.

According to an embodiment of the invention, defining for each task an adjustment margin based on the positions determined in the second step, defining in which degrees of freedom the optimization algorithm is allowed to adjust the positions and orientations of the workstations, and adjusting the positions of the workstations based on the defined adjustment margins and the degrees of freedom for the workstations. This allows for a much more efficient and quicker search where minor variations in small decimal places are eliminated and the search algorithm checks significant positions.

According to a further aspect of the invention, the object is achieved by a computer program product directly loadable into the internal memory of a computer or a processor, comprising software code portions for performing the steps of the method when the program is run on a computer.

According to another aspect of the invention, the object is achieved by a computer readable medium having a program recorded thereon, when the program is to make a computer perform the steps of the method and the program is run on the computer.

According to another aspect of the invention, the object is achieved by a system.

Such a system comprises: a central processing unit, a memory device for storing program and data, a first optimization module configured to place the tasks inside or as close as possible to a defined preferred region within the reachable range of the robot using an evaluation criterion and an optimization algorithm, and based thereon assigning to each workstation a position inside or close to the preferred region, a second optimization module configured to determine by means of an optimization algorithm a best order of the workstations to be placed relative to the robot with regard to the robot performance and a defined order in which the tasks has to be executed, and based thereon adjust the positions of the workstations, and a third optimization module configured to adjust the positions of the workstations by means of an optimization algorithm configured to run the robot program iteratively in order to optimize the placement of the workstations with regard to the robot performance.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1A:
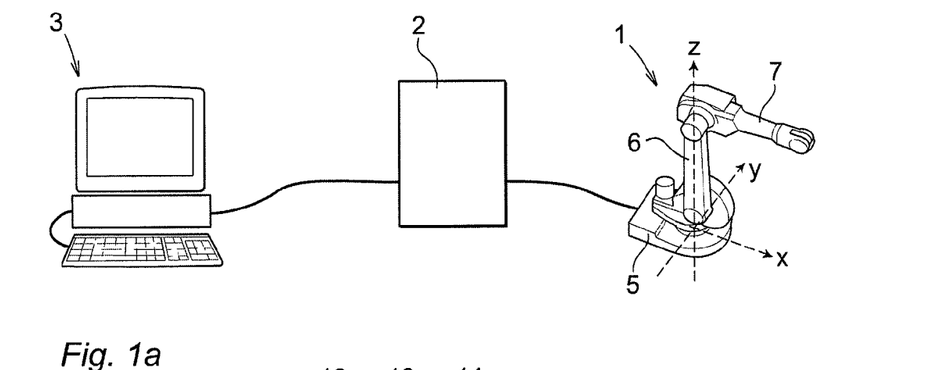
FIG. 1a shows a robot system including a robot and an external computer.

FIG. 1a shows a robot system including a robot 1, a robot controller 2 and an external computer 3 configured to communicate with the robot controller. The robot includes a plurality of robot parts movable relative to each other. The robot parts are in this case a base frame 5, and robot arms 6,7. The base frame 5 of the robot is arranged in a fixed position relative to the ground. A base coordinate system X, Y, Z is defined relative to the base frame of the robot. The robot is rotatable about the base frame in the Z-direction of the base coordinate system of the robot. The robot controller is configured to control the movements of the robot in accordance with a control program including instruction for moving the robot along paths in order to carry out a sequence of tasks on a plurality of workstations. The external computer includes a processor, such as a central processing unit (CPU), memory for storing programs and data, user input means, such as a keyboard and a mouse, communication means for communicating with the robot controller, and a display device. The software for carrying out the method according to the invention is preferably stored in the memory of the external computer and is executed by the processor of the external computer. However, in an alternative embodiment the software can be stored and run on the controller of the robot, or on a handheld control unit, called a teach pendant unit, of the robot.

Figure 1B:
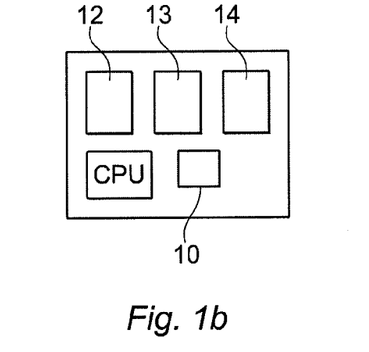
FIG. 1b shows a schematic block diagram of a system for automatic optimization of the placement of a plurality of workstations in a robot workcell according to the invention.

FIG. 1b shows a schematic block diagram of a system for automatic optimization of the placement of a plurality of workstations in a robot workcell according to the invention. The system includes a CPU, a memory 10 for storing program and data, a first optimization module 12 configured to place the tasks inside or as close as possible to a defined preferred region, a second optimization module 13 configured to determine a best order of the workstations to be placed relative to the robot, and a third optimization module 14 configured to adjust the positions of the workstations by optimizing the layout of the whole workcell, by an optimization algorithm configured to run the robot program iteratively in order to optimize the placement of the workstations.

Figure 2:
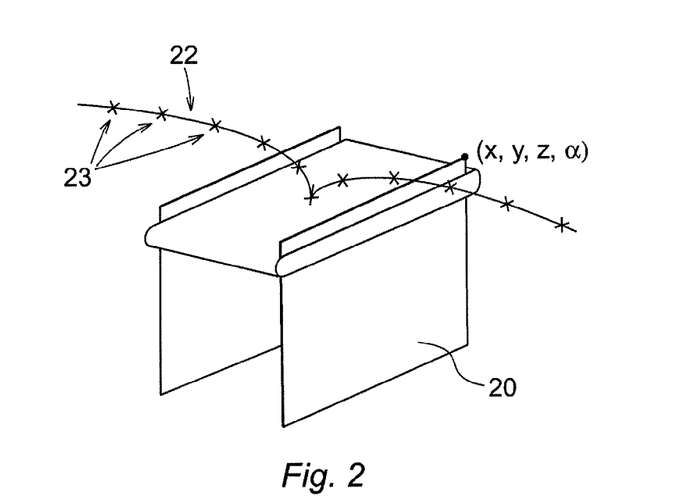
FIG. 2 shows an example of a task and a workstation.

FIG. 2 shows an example of a workstation 20 and a task 22. The placement of the workstation is defined by a position (x, y, z) and an orientation ($\alpha$) about the vertical line. In the examples described in herein, the optimization of the placement is done in four degrees of freedom (x, y, z, $\alpha$). However, it is also possible to optimize the placement of the workstations in any of 1-6 degrees of freedom. The task 22 contains a series of robot target points 23 linked as a path that the robot will visit when carrying out the task. Each task has an associated geometrical model of the workstation, which serves as a placeholder of the task. The geometrical models are, for example stored on the external computer 3. The positions of the target points are fixed and known in relation to the workstation. If the position of the task is known, the position of the workstation is also known. In the following, the term "position of the task" and "position of the workstation" are used synonymously.

Figure 3:
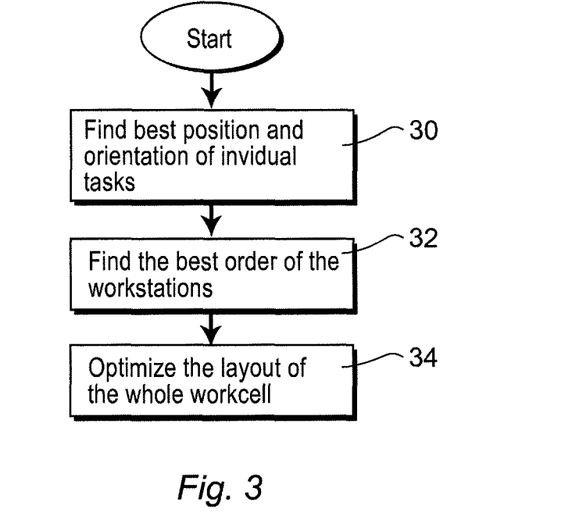
FIG. 3 shows a flow chart illustrating the three main steps of a method for optimizing of the placement of a plurality of workstations in a robot workcell according to an embodiment of the invention.

FIG. 3 shows a flow chart illustrating the three main steps of a method for optimizing of the placement of a plurality of workstations in a robot workcell according to an embodiment of the invention. The position of the robot is fixed. The method involves three major steps. In the first step 30, the best position of each individual robot task is determined by means of putting the task into a preferred region and then adjusting the task orientation; In the second step 32, all the robot tasks are put into consideration together thus to find the best order of these tasks according to the robot operational sequence; then in the third step 34, the positions of all robot tasks are tuned together to find the optimal cell layout, for example in terms of minimum cycle time. The solution map also includes additional functions that can indicate and evaluate manual adjustment, which can be used to compare with and thus validate the presented method.

The First Step "Individual Task Placement"

Figure 4:
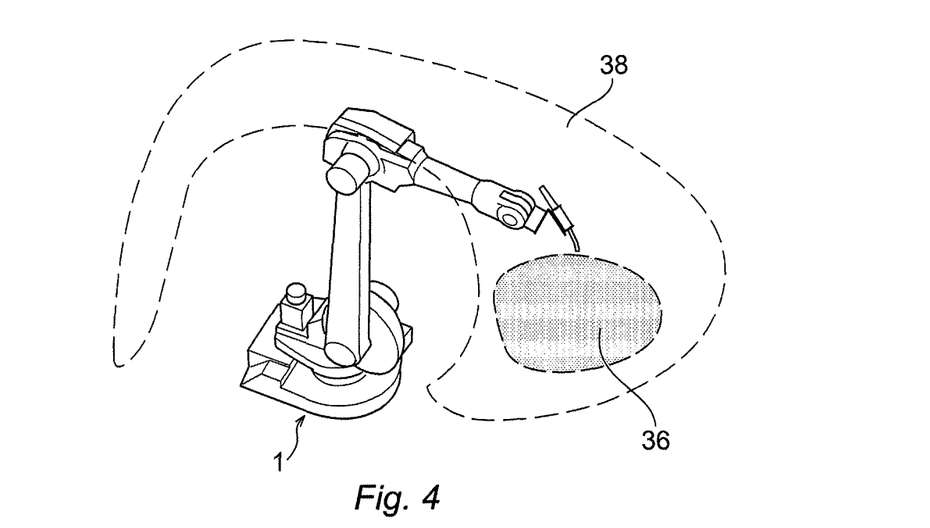
FIG. 4 shows an example of a preferred region.

In the first step of the method, the placement of each workstation is done individually, without considering if the placement is optimal with regard to the placement of the other workstations in the workcell. Based on statistics analysis, most of the robot tasks are placed in a concentrated region within the robot reachable range. Beforehand, a preferred region within the reachable range of the robot has been defined. FIG. 4 shows an example of a preferred region 36 defined within the operability area 38 of the robot. The preferred region is the region that can ensure best robot performance in terms of robot kinematics and kinetics. If one or more tasks can be put into the preferred region, a good robot performance, and hence a reduced cycle time can be expected. For example, high acceleration of the tool central point in different directions, or in specified directions, can be ensured if the task is placed in such a zone. The preferred region can be defined by mathematics way or based on engineering experience. In this embodiment, the preferred region is defined based on experience. This can be acceptable since task positioning involving the preferred region is in the initialization stage, the final task position will be ensured by the final optimization stage.

In the first step, a preferred region within the reachable range for a used robot model, which can ensure best robot performance in terms of kinematics and kinetics, is loaded (if it exists in a library) or otherwise identified. The tasks are placed separately inside or as close as possible to the preferred region using an evaluation criterion and an optimization algorithm. For example, the sum of the distance from each robot target that forms the task to the center of the preferred region is minimized.

Thereafter, each task is reoriented separately with a set of sample positions, and hence to determine the best orientation of the task by either of the following ways: 1) comparing the results that indicate robot performance, such as cycle time, from the sample positions and choose the best one; 2) fitting the results that indicate robot performance, such as cycle time, from the sample positions with a function, and then defining the best orientation of the task according to the minimum value of the fitted function in the specified range of variation.

Figure 5:
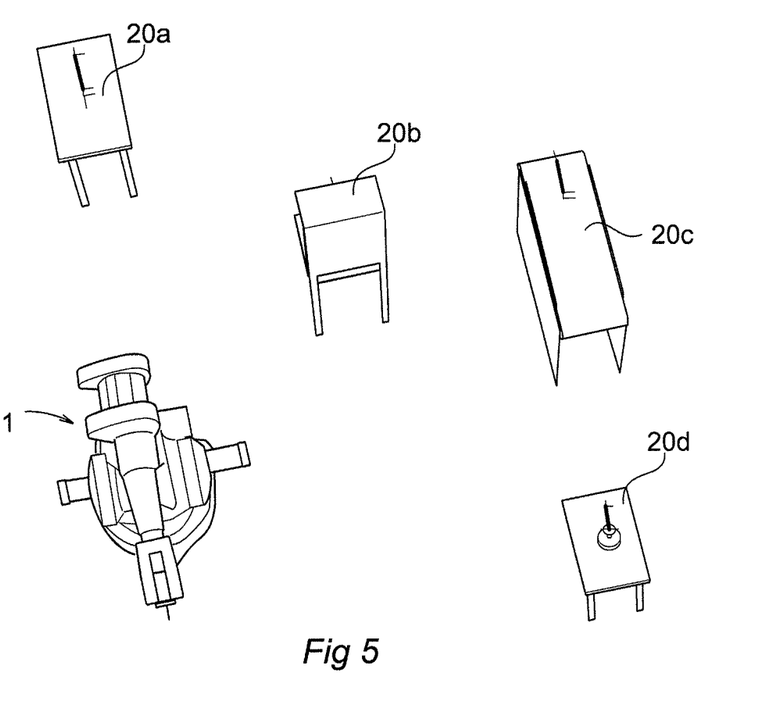
FIG. 5 shows an example of initial positions of the workstations in relation to the robot in the workcell before the optimization.

The user selects which workstations are to be included in the workcell, the placement of which shall be optimized. The selected workstations are displayed together with the robot and the workcell, for example on the display device of the external computer 3. FIG. 5 shows the initial positions of the workstations in relation to the robot in the workcell before the optimization. In this example, the workcell includes four workstations 20a-d.

Figure 6:
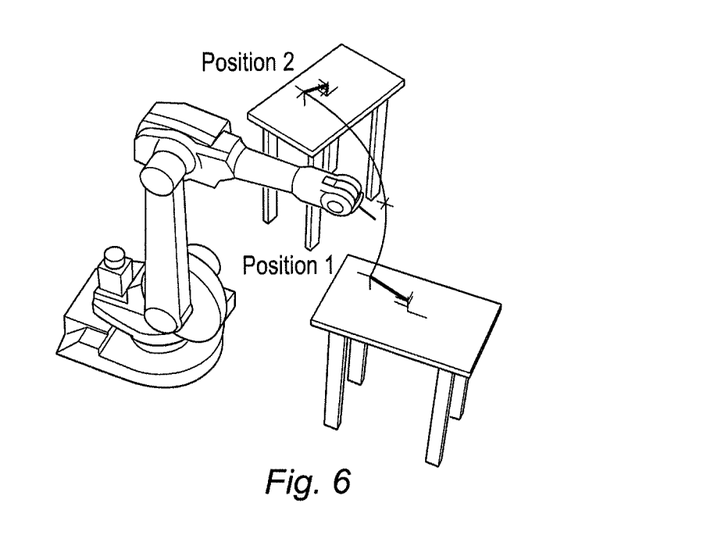
FIG. 6 shows that position 1 and position 2 are both the best position of task relative to the robot.

In the stage of individual task placement, it is assumed that the best position of a task will remain best when only the first axis, which rotates about the z-direction of the robot base coordinate system, rotates differently for tending the task. As shown in FIG. 6, when the task is changed from Position 1 to Position 2, the task is still in the best position for the robot to tend. The best position of a task is obtained by placing the task inside the preferred region, or as close as possible to the preferred region, and then adjusting the task orientation.

The following criteria are considered when using the preferred region to derive the best individual task position:

Position of a task: all the targets of a task should be included, or as close as possible to the preferred region.

Orientation of a task: a task should be rotated in user frame such that minimum cycle time can be reached for a fixed position.

Based on above criteria, the individual station placement can be further divided into two sub-steps.

Sub-Step 1: Put all the targets of a task into the preferred region, or as close as possible to the preferred region, according to equation (1):

$$Pos\_A = \arg\left(\min\left(\sum_{i=1}^{Nt} dis(T_i, P)\right)\right) \quad (1)$$

Where:
Pos_A is the derived position of a task;
Nt is the target number of a task;
$dis(T_i, P)$ is the distance of the target i to the center P of the preferred region.

In this sub-step, only mathematical computing is required. It is not necessary to communicate with robot controller to evaluate the task executing time, and hence this is a quite efficient step.

Sub-Step 2: Based on sub-step 1, the orientation of a task can be adjusted according to equation (2):

$$Pos\_B = \arg(\min(CT(\alpha))) \quad (2)$$

Where:
Pos_B is the derived task position;
$\alpha$ is the rotation angle of a task, $\alpha \in [-\pi, \pi]$. (The range of $\alpha$ can be changed which is determined based on actual work cell layout restriction)
$CT(\alpha)$ is the cycle time as the function of $\alpha$.

Here CT is the function of the only variable $\alpha$. A small group of experiments to evaluate cycle time of a task at the same position but with different orientations are conducted based on the sampling value of $\alpha$. For each of the experiment, cycle time is obtained via executing the task by real robot controller. The sample value of $\alpha$ for each experiment can be a discrete point within the adjustable range of $\alpha$, for example, stepped by $\pi/8$. The best rotation angle of a task can be obtained by either of the following ways:

The relationship of $\alpha$ and the task executing time can be further fitted as a polynomial function, and hence to get the best rotation angle of a task from the minimum value of the fitted polynomial function. Directly find the best sample value of $\alpha$ that corresponds to the minimum task executing time for all sample positions.

As an initial adjustment followed by further optimization, a relatively low discrete degree of $\alpha$ is acceptable. Hence Pos_B can be derived which corresponds to the best $\alpha$.

The following two conditions need to be satisfied in this orientation adjusting step:
  a) Any placement of the task must ensure that robot can reach all the targets of a task.
  b) Any placement of a task must ensure that robot can go through all the paths of a task.
  c) The associated geometrical model and robot are free of collisions.

Figure 7:
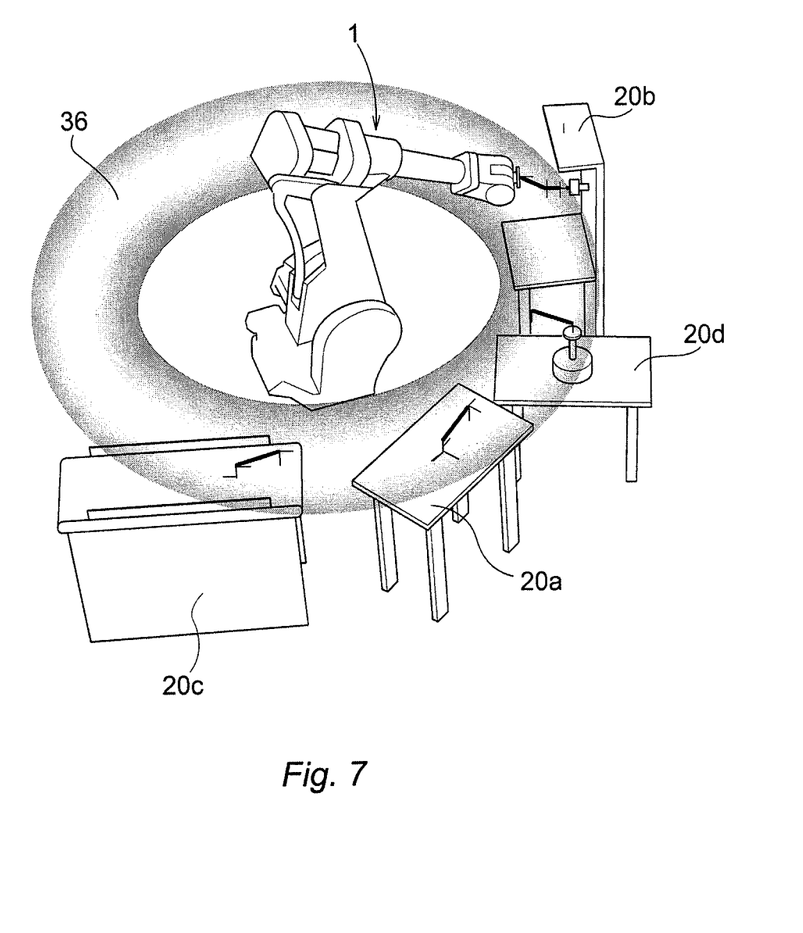
FIG. 7 shows an example of the layout of the workcell after the first optimization step.

FIG. 7 shows an example of the layout of the workcell after the first optimization step. The preferred region is denoted 36.

The best position of an individual task found in this stage will be the input for the following task sorting step.

The Second Step "Task Sorting"

This step includes determining the spatial positions of all tasks according to the robot visiting sequence with use of optimization methods, such as but not limited to Genetic Algorithm. Favorable circumferential positions of the workstations relative to the robot are determined with regard to the robot performance and a defined order in which the tasks has to be executed, and based thereon the positions of the workstations are adjusted.

When the best position of each individual task has been obtained, it comes to a question on how to put all tasks into consideration for a best overall work cell layout. If the best position of a task obtained in the first step can remain the best when the task is positioned differently in the work cell, the best work cell layout can be obtained when all tasks is in the best order.

As stated above, the assumption is that if a task rotated only around the Z-axis of the robot base frame, it will not influence the cycle time for robot executing the task. That means the best position of a task will be remained if it is only rotated around Z-axis of the robot base frame. In such a case, the solution for task sorting can be concluded: all tasks are put into the work cell together. Each task keeps its position and orientation obtained in the first step, but rotated with different angles around the Z-axis of the robot base frame. The sequence and the gap among all tasks can be adjusted for a minimum travel distance when robot executes all tasks according to the defined visit order. The measurement for the travel distance can be expressed as equation (3):

$$Fn(s) = \sum_{i,j} dis(stn_i, stn_j) \qquad (3)$$

Where:
Fn(s) is the fitness of order s.
i: ID number of the task i.
j: ID number of the task next to task i that the robot will visit.
$dis(stn_i, stn_j)$: Robot travel distance from task i to task j.

In equation (3), solution evaluation does not involves cycle time calculation, thus it's a fast calculation considering the present computer capacity. This brings great advantage in optimization method selection, which may involve relatively large searching space.

Suppose there are M tasks to be sorted. Then there are totally M! possible solutions for task sorting. When M is small, searching in the space with dimension of M! is possible. However, if M is large, searching the whole solution space is quite time consuming. In such a case Genetic Algorithm (GA) is employed to search the best order of tasks when the task number is large, since GA has been found to be an effective optimization method when solving combinational optimization problems with large dimension.

The conditions to be satisfied in task sorting are listed as follows:
1. Collision free among all tasks associated geometrical models and the used robot;
2. Each target is reachable by the used robot;
3. Evaluating of robot travel distance should be based on the visit sequence of all tasks according to the application needs.

Figure 8:
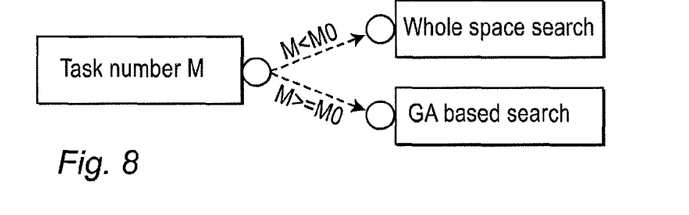
FIG. 8 shows a switched method in the second optimization step.
Figure 9:
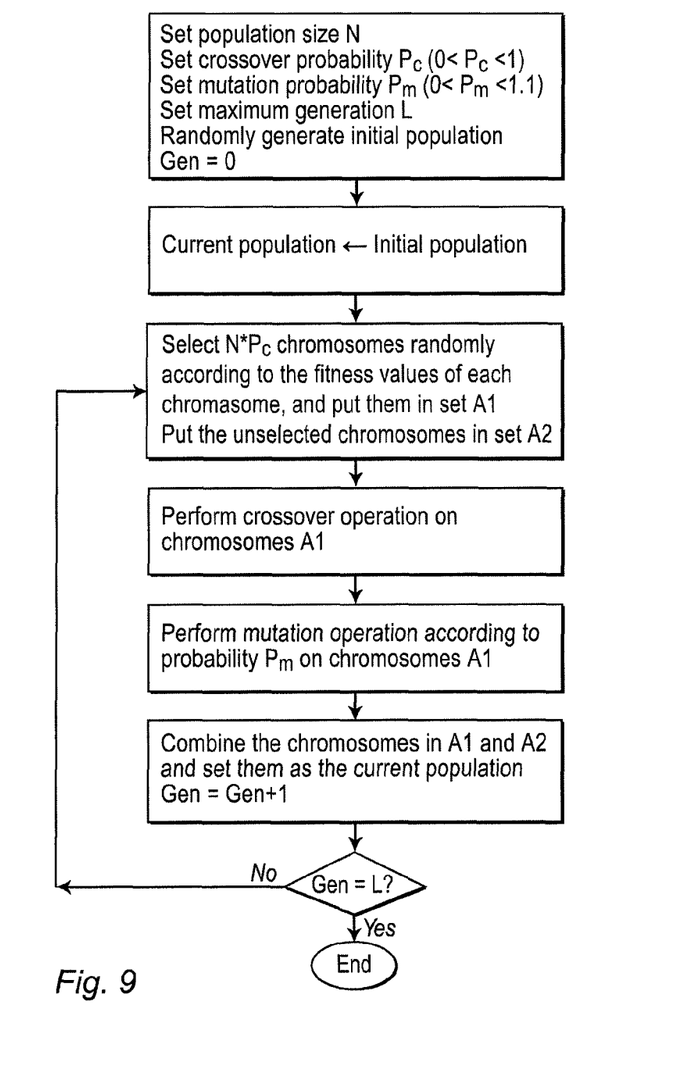
FIG. 9 shows a flowchart of a Genetic Algorithm based search used in the second step.

Based on the analysis mentioned above, the problem of task sorting is proposed to be solved using a switched method, shown in FIG. 8. When total task number M<M0 (M0 is a threshold), the best order will be searched in the whole search space with dimension of M!; while when M>=M0, the search method switches to GA based method to reduce the time cost. In either search, if an order doesn't satisfy all the conditions listed in above, the order is discarded.
1.) Whole space search: this search method is straightforward.
2.) GA based search FIG. 9 shows a flowchart of GA based search in the task sorting step. In FIG. 9, each chromosome represents a sequence of the task IDs, and each task ID is a gene. The initial population is set as N, the crossover probability is set as Pc, and the mutation probability is set as Pm. Firstly the initial population of chromosomes is generated randomly. After that, N*Pc chromosomes are selected randomly from the population according to their fitness value to perform crossover operation which is described in the next section. The fitness of each chromosome is calculated by the travel distance between the tasks, as given in equation 3. Then, N*Pm chromosomes are selected to perform mutation operation. The crossover operation and the mutation operation produce the new generation of the chromosomes. When the maximum generation L is reached, GA comes to the end. The best solution in generation L is the optimal sorting solution.

The crossover operation: traditional crossover operation is performed in a pair of chromosomes, for example, chromosome 1 and chromosome 2. But this may bring frequent trouble in which the constraint that a task ID can only appear and must appear once in one order sequence is not satisfied. Thus here the Enhanced Edge Recombination operation is adopted.

Suppose the fitness of chromosome s in generation i is Fn(s, i) (can be calculated via equation (3)), the crossover probability of chromosome s is calculated as:

$$pr_c(s, i) = Fn(s, i) \bigg/ \sum_{j=1}^{N} Fn(j, i) \qquad (4)$$

In above equation, N is the size of the population. Whether chromosome s is selected to perform crossover operation or not is determined by Roulette Wheel Selection according to Pc and $pr_c(s, i)$.

The mutation operation: in the selected chromosomes, select one gene to perform mutation operation according to probability Pm. The selected gene mutates in {1, 2, ..., M}, M is the total task number. Suppose the value of the selected gene is u, and it mutates to v, thus the gene whose value is v must change to u to satisfy the constraint that a task ID can only appear and must appear once in one order sequence.

End criterion: the maximum generation L is used as the end criterion of the search method. L is set to be sufficient large to guarantee the performance of the final solution. The best solution in generation L is the optimal sorting solution.

The task sorting step may use other optimization methods, for example, Neutral Networks, Particle Swarm Optimization, Ant Colony Algorithm, Simulated Annealing, etc.

Figures 10, 12:
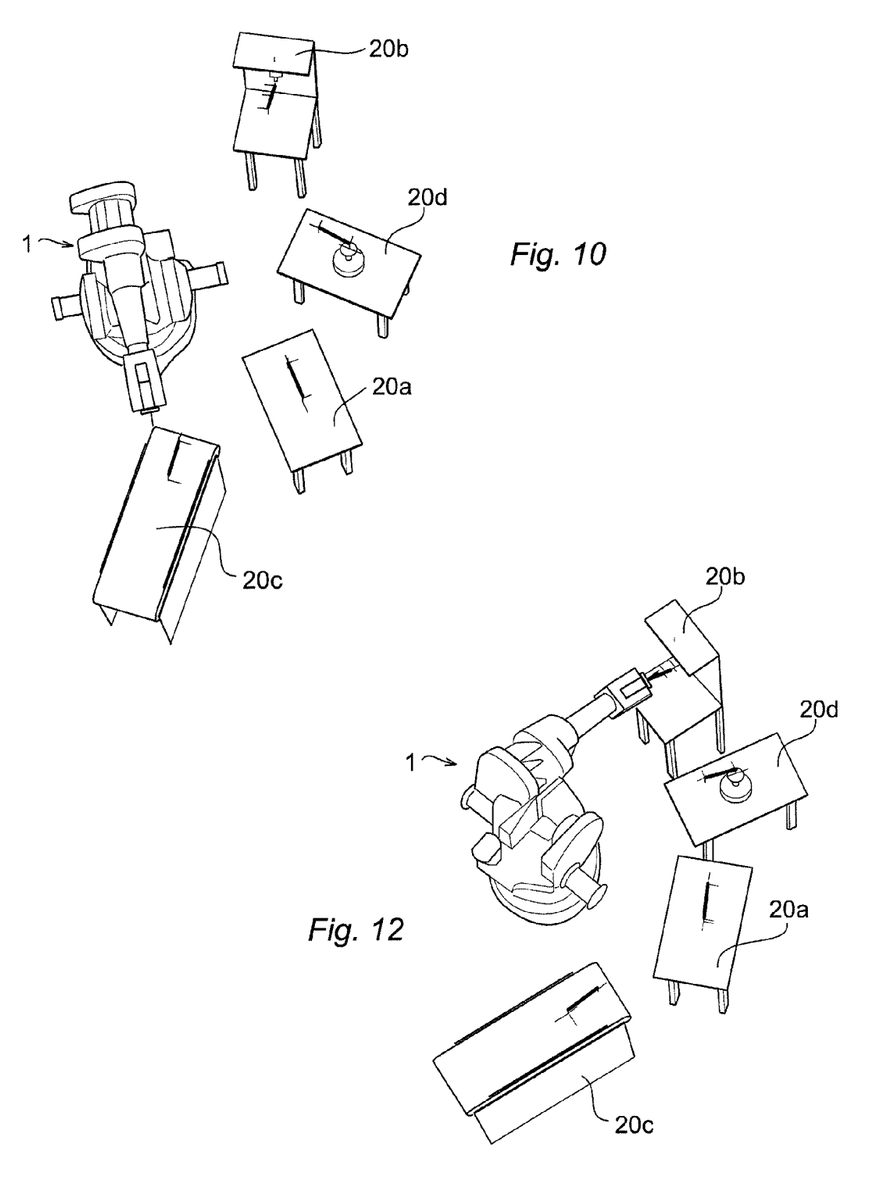
FIG. 10 shows an example of the layout of the workcell after the second optimization step.
FIG. 12 shows an example of the layout of the workcell after the third optimization step.

FIG. 10 shows the layout of the workcell after the second optimization step.

The Third Step "Cell Layout Optimization"

This step includes adjusting the positions of the workstations by means of an optimization algorithm configured to run the robot program iteratively in order to optimize the placement of the workstations with regard to the robot performance. Adjustment margin and degree of freedom for each task is defined based on results from above steps. The positions of all workstations are adjusted for a final optimal solution, for example in terms of minimum cycle time, by the optimization methods that can ensure better and better solution, such as but not limited to Simulated Annealing Algorithm.

After the first two steps, a good position of each robot task, and good spatial layout of all tasks in a work cell can be obtained. But the derived solution is based on two assumptions:
1) The preferred region can ensure good robot performance for a robot task, and hence a good robot execute time can be expected;
2) If a task rotates only around the Z-axis of the robot base frame, it will not influence the time for robot executing the task.

Based on the above assumptions, solution evaluation does not involve running robot program via communicating with real robot controller in above two major steps besides the sub-step of the first step for determining the best rotation angle of a task. In this way, a good solution can be obtained quite efficiently. But the solution obtained cannot be guaranteed as the best one since the real executing time for all tasks is not used as the judgment. Another optimization stage needs to be conducted where the real executing time for all robot tasks needs to be used for solution evaluation. This is fitted with the algorithm design strategy for the overall solution: to seek balance between efficiency and solution quality. The first two major steps can quickly obtain a solution approaching optimum. With this solution as the input, the adjusting space for each task in the final optimization stage can be greatly reduced, which can shorten the algorithm running time a lot since each iteration of the final optimization involves evaluating cycle time via communicating with robot controller.

Figure 11:
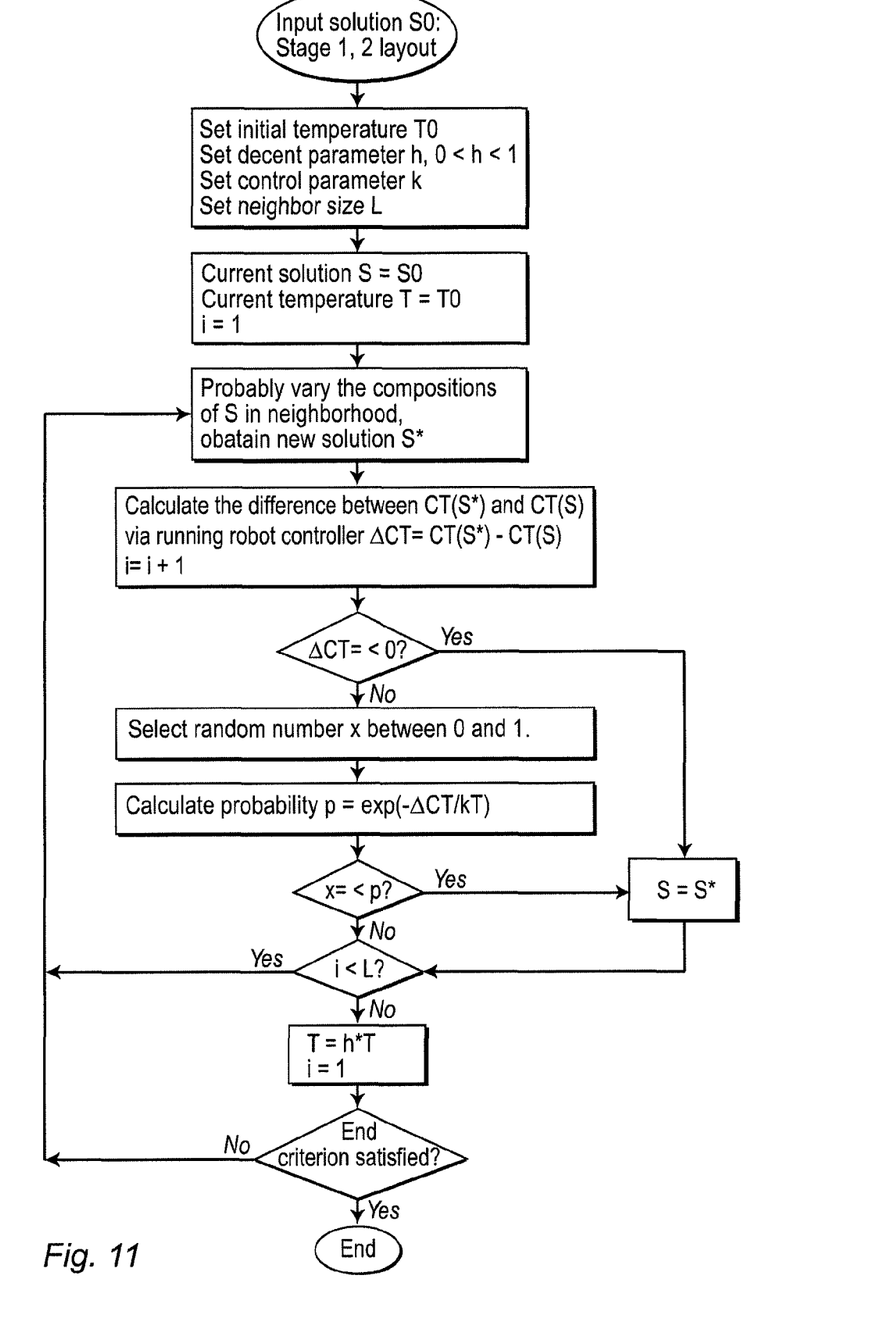
FIG. 11 shows a flowchart of Simulated Annealing based optimization used in the third optimization step.

In the final optimization stage, the positions of all tasks are adjusted simultaneously to optimize the cell layout. The solution here is based on Simulated Annealing Approach (SA), as shown in FIG. 11. As this step involves running robot program iteratively to optimize the cell layout, which is time consuming, SA is selected here because it can provide better and better solutions which provides flexibility to a user. That is, a user can stop the optimization procedure if he or she is satisfied with the found solution up to now. It is to point out that the searching space here is much smaller than the search space in U.S. Pat. No. 6,526,373 and EP1107082, since the input to the optimization solution is the layout generated through the first and second step, which can be regarded as a good solution base.

FIG. 11 shows the flowchart of Simulated Annealing based approach in the final cell layout optimization stage. The input solution to this stage S0 is the near-optimal layout obtained from the first two stages, thus the adjusting space for each task in the final stage is greatly reduced. Each solution is composed of the positions of all tasks. The evaluation of each solution is the actual executing time for all robot tasks. FIG. 11 shows how SA works. SA is briefly described as follows:

1) Set initial temperature T0, decent parameter h, 0<h<1, control parameter k, neighbor size L. T is a global time-varying parameter to control the search steps. At the beginning, it is set high, meaning that the new solution may be accepted even when it is worse than the current one according to probability p. This feature prevents the method from becoming stuck in a local minimum. L means to search L neighbors of the current solution. L can be determined according to the actual situation; however, considering the evaluation cost of each layout, it has to be small here. k is a parameter to control the relative weight of $\Delta CT$ and T.
2) If L neighbors have been searched for solution S, go to 7); else randomly vary the compositions of S in neighborhood, obtain new solution S*.
3) Calculate the difference between CT(S*) and CT(S) via running robot controller, $\Delta CT = CT(S^*) - CT(S)$. CT(S) is the cycle time of solution S.
4) If $\Delta CT<0$, accept the current solution S*, go to 2); else go to 5).
5) Select random number x between 0 and 1.
6) Calculate probability $p=\exp(-\Delta CT/kT)$. If x<p, accept the current solution S*, go to 2); else go to 7).
7) Set T=h*T. If the end criterion is satisfied, end the algorithm; else go to 2).

It is to point out that SA can start with any initial layout. This provides flexibility to a user: An initial solution can be specified as the starting point to trigger the optimization procedure; the optimizing process can be stopped during algorithm executing with intermediate result, and resumed with the intermediate result as the starting point.

FIG. 12 shows the layout of the workcell after the third optimization step.

The optimization methods for final tasks adjustment may comprise other optimization methods, for example, Neutral Networks, Particle Swarm Optimization, Ant Colony Algorithm, Genetic Algorithm, etc.

All tasks are treated equally and handled simultaneously during the second and third steps.

Each iteration of the either optimizing method, i.e., for task sorting and final layout adjusting, may include the following sequential steps: task repositioning, task configuring, generating executable robot program and synchronizing with robot controller, and finally evaluating cycle time by running the robot program.

The present invention is not limited to the embodiments disclosed but may be varied and modified within the scope of the following claims.

For example, the objective for optimizing cell placement can be minimum cycle time, or other indexes that reflect robot performance.

For example, each of the tasks is allowed to be adjusted with all possible freedoms (translating along x, y or z axis, and rotating around x, y or z axis), or in limited freedoms as specified.

For example, the task placing method mentioned above can be applied in the other way round: the positions of the tasks are fixed, while the position of the robot is adjusted to reach optimal solution, for example, in terms of minimum cycle time.

The evaluation of cycle time for each iteration of either said optimization methods may further be obtained using analytical approach via robot kinematical and kinetic models, and are not limited to evaluating cycle time via communicating with robot controller. The execution of the robot program can be achieved by running the program on the real robot, on an virtual robot controller, a specially built interpreter, or other devices designed to analyze a robot program and return an estimated optimization parameter, such as cycle time or energy.

The invention claimed is:

1. A method for optimizing placement of a plurality of workstations in a workcell including an industrial robot programmed with a robot program to execute a sequence of tasks on the workstations in a defined order, wherein each task contains a series of robot targets linked as one or several paths to be visited by the robot when executing the tasks at the workstation, the robot targets have fixed positions relative to the workstation, the method comprising:

defining a preferred region within the reachable range of the robot, determining a best position for each workstation by placing the tasks inside or as close as possible to the preferred region using an evaluation criterion and an optimization algorithm, and based thereon assigning to each workstation a position inside or close to the preferred region, determining favorable circumferential positions of the workstations relative to the robot utilizing an optimization algorithm configured to minimize cycle time, stress, energy consumption or acceleration when the robot executes all tasks according to the defined order, and based thereon adjusting the positions of the workstations, and adjusting the positions of the workstations utilizing an optimization algorithm configured to run the robot program iteratively in order to optimize the placement of the workstations with regard to minimum cycle time, stress, energy consumption or acceleration.

2. The method according to claim 1, wherein each of the tasks has an associated geometrical model of the workstation, and in each step, the placement of the workstations is made with regard to satisfying the following conditions:

the placement of the workstation must ensure that the robot reaches all targets of the path, and associated geometrical model and the robot are free of collisions.

3. The method according to claim 1, wherein the preferred region is based on kinematic reachability using a given tolerance for potential changes.

4. The method according to claim 1, wherein the preferred region is based on a zone of maximum robot performance, performance being defined as one or several measurable robot parameters, given a certain tolerance.

5. The method according to claim 1, wherein defining the preferred region further comprises determining utilizing an angle optimization algorithm a favorable orientation for each of the workstations with regard to the robot performance.

6. The method according to claim 1, wherein the defined order of the workstations is determined by determining favorable circumferential positions of the workstations relative to the robot with regard to the robot performance, and adjusting the positions of the workstations such that the workstations are kept in their radial positions in relation to the robot obtained during defining of the preferred region, and the circumferential positions of the workstations becomes equal to or close to the determined favorable circumferential positions.

7. The method according to claim 6, wherein the optimization algorithm is configured to seek circumferential positions of the workstations and distances between the workstations which minimize the distance traveled by the robot when the robot executes all tasks according to the defined order.

8. The method according to claim 1, wherein adjusting the positions of the workstations further comprises:
defining for each task an adjustment margin based on the positions determined, and
defining in which degrees of freedom the optimization algorithm is allowed to adjust the positions and orientations of the workstations, and adjusting the positions of the workstations based on the defined adjustment margins and the degrees of freedom for the workstations.

9. The method according to claim 1, wherein during adjusting of the positions of the workstations the optimization algorithm uses the real execution time for all robot tasks in order to optimize the placement of the workstations with regard to the robot performance.

10. The method according to claim 1, wherein the optimization algorithm used during adjusting of the positions of the workstations is based on a Simulated Annealing method.

11. The method according to claim 1, wherein in adjusting the positions of the workstations the positions of all the workstations are adjusted simultaneously to optimize the placement of the workstations.

12. A computer program product, comprising:
a non-transitory computer readable medium; and
computer program instructions recorded on the computer readable medium and executable by a processor to perform a method for optimizing placement of a plurality of workstations in a workcell including an industrial robot programmed with a robot program to execute a sequence of tasks on the workstations in a defined order, wherein each task contains a series of robot targets linked as one or several paths to be visited by the robot when executing the tasks at the workstation, the robot targets have fixed positions relative to the workstation, the method comprising:
defining a preferred region within the reachable range of the robot,
determining a best position for each workstation by placing the tasks inside or as close as possible to the preferred region using an evaluation criterion and an optimization algorithm, and based thereon assigning to each workstation a position inside or close to the preferred region,
determining favorable circumferential positions of the workstations relative to the robot utilizing an optimization algorithm configured to minimize cycle time, stress, energy consumption or acceleration when the robot executes all tasks according to the defined order, and based thereon adjusting the positions of the workstations, and
adjusting the positions of the workstations utilizing an optimization algorithm configured to run the robot program iteratively in order to optimize the placement of the workstations with regard to minimum cycle time, stress, energy consumption or acceleration.

13. A system for optimizing the placement of a plurality of workstations in a workcell including an industrial robot programmed to execute a sequence of tasks on the workstations in a defined order, wherein each task contains a series of robot targets linked as one or several paths to be visited by the robot when executing the task at the workstation, the robot targets have fixed positions relative to the workstation, the system comprising:
a central processing unit,
a memory for storing program and data,
a first optimization module configured to determine a best position for each workstation by placing the tasks inside or as close as possible to a defined preferred region within a reachable range of the robot using an evaluation criterion and an optimization algorithm, and based thereon assigning to each workstation a position inside or close to the preferred region,
a second optimization module configured to determine favorable circumferential positions of the workstations relative to the robot utilizing an optimization algorithm configured to minimize cycle time, stress, energy consumption or acceleration when the robot executes all tasks according to the defined order, and based thereon adjust the positions of the workstations, and
a third optimization module configured to adjust the positions of the workstations utilizing an optimization algorithm configured to run the robot program iteratively in order to optimize the placement of the workstations with regard to minimum cycle time, stress, energy consumption or acceleration.

14. The system according to claim 13, wherein the preferred region is based on kinematic reachability using a given tolerance for potential changes.

15. The system according to claim 13, wherein the preferred region is based on a zone of maximum robot performance, performance being defined as one or several measurable robot parameters, given a certain tolerance.

16. The system according to claim 13, wherein said memory is configured to store geometrical models of the workstations, and each of the optimization modules is configured to carry out the placement of the workstations with regard to the satisfaction of the following conditions:
the placement of the workstation must ensure that the robot reaches all targets of the path, and
the geometrical model of the workstation and the robot are free of collisions.

17. The system according to claim 13, wherein the first optimization module is further configured to determine utilizing an angle optimization algorithm a favorable orientation for each of the workstations with regard to the robot performance.

18. The system according to claim 13, wherein said optimization algorithm used in the second optimization module is configured to seek the defined order of the workstations by determining favorable circumferential positions of the workstations relative to the robot with regard to the robot performance, and adjusting the positions of the workstations such that the workstations are kept in their radial positions relative to the robot obtained by the first optimization module, and the circumferential positions of the workstations becomes equal to or close to the determined favorable circumferential positions.

19. The system according to claim 13, wherein said optimization algorithm used in the second optimization module is configured to seek circumferential positions of the workstations and distances between the workstations which minimize the distance traveled by the robot when the robot executes all tasks according to the defined order.

20. The system according to claim 13, wherein the third optimization module is configured to simultaneously adjust the positions of all the workstations in order to optimize the placement of the workstations.

\* \* \* \* \*